F. COLLISCHONN.
DRIVING MECHANISM FOR MOTOR VEHICLES.
APPLICATION FILED FEB. 24, 1910.

1,083,730.

Patented Jan. 6, 1914.

UNITED STATES PATENT OFFICE.

FRIEDEL COLLISCHONN, OF FRANKFORT-ON-THE-MAIN, GERMANY, ASSIGNOR, BY MESNE ASSIGNMENTS, TO GENERAL ELECTRIC COMPANY, A CORPORATION OF NEW YORK.

DRIVING MECHANISM FOR MOTOR-VEHICLES.

1,083,730.  Specification of Letters Patent.  Patented Jan. 6, 1914.

Application filed February 24, 1910. Serial No. 545,674.

*To all whom it may concern:*

Be it known that I, FRIEDEL COLLISCHONN, a subject of the German Emperor, and a resident of Frankfort-on-the-Main, Germany, have invented certain new and useful Improvements in Driving Mechanisms for Motor-Vehicles, of which the following is a specification.

This invention relates to improvements in driving mechanisms for motor vehicles, and more particularly in motor vehicles of that class in which power can be directly transmitted from a driving member or prime mover to the wheels, or indirectly by means of a secondary mover driven by said prime mover and transmitting the power to the wheels.

The object of the improvements is to provide a mechanism of this class in which when starting the machine and driving the same directly by the prime mover the vehicle can gradually be started. For this purpose the mechanism is so constructed, that the differential gearing is made use of also in case the power is directly transmitted from the prime mover to the wheels.

With this object in view the invention consists in providing a mechanism which consists of the combination of a prime mover, a single electric generator adapted to be driven by said prime mover, a plurality of electromotors adapted to be driven by the electric current supplied by the electric generator and to transmit power to the wheels of the vehicles or driven member or members, means for coupling the prime mover and the driving mechanism for the wheels of the vehicle, and a differential gearing connected with the said driven members.

For the purpose of explaining the invention two examples embodying the same have been shown in the accompanying drawing in which the same letter references have been used in all the views to indicate corresponding parts.

Figure 1:
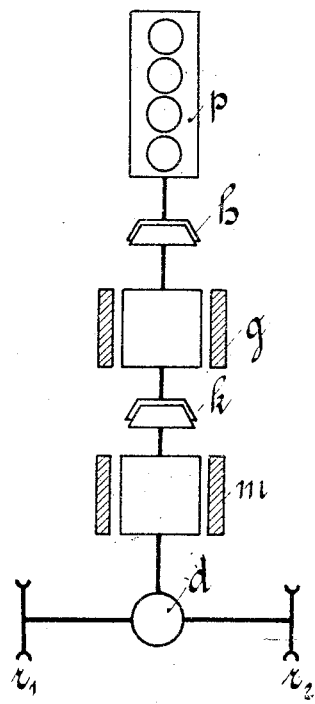
Figure 2:
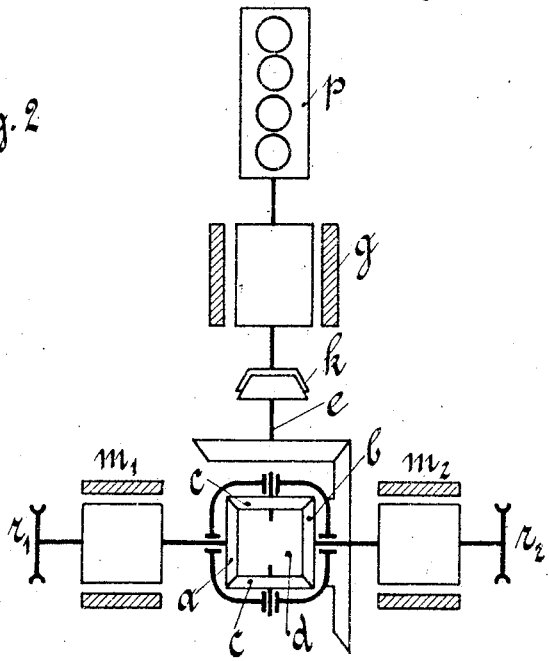

In said drawing—Figure 1, is a diagrammatical plan of the mechanism comprising a single electromotor, and Fig. 2, is a diagrammatical plan of a mechanism comprising two electromotors.

Referring particularly to the example illustrated in Fig. 1 of the drawing, the prime mover, which may be for example a benzin motor, has been indicated by the letter $p$. The said prime mover is connected with the armature of a dynamo electric generator $g$. In the preferred form a clutch $h$ is interposed between the prime mover and the dynamo, which clutch may be constructed as a friction or sliding clutch. The electromotor has been indicated by the letter $m$. Its armature can be connected to the armature of the dynamo by means of a clutch $k$. In the drawing the field magnets of the electrical machines, the collectors and other subsidiary apparatus have not been shown.

In the example shown in Fig. 1 the shaft of the armature of the electromotor $m$ drives a pair of sprocket wheels $r^1$ and $r^2$ through the intermediary of a differential gearing $d$ of known construction, which sprocket wheels are connected by chains to the wheels of the vehicle as is common in vehicles of the character described. Instead of driving the wheels by means of the said sprocket wheels and chains the said wheels may be directly coupled to the differential gear.

In the example illustrated in Fig. 2 two electromotors $m^1$ and $m^2$ are used which are mounted on shafts of the driven wheels $r^1$ and $r^2$ respectively and which are connected to gears $a$ and $b$ of the differential gearing $d$. The planet gears $c, c$ of the latter are driven from the shaft $e$ adapted to be coupled to the shaft of the armature of the electric generator $g$ and the prime mover $p$ by means of a clutch $k$.

In both cases the current is directly or indirectly supplied to the electromotor or electromotors from the generator $g$.

The operation of the mechanism is as follows. If the prime mover is coupled exclusively to the generator $g$ and the clutch $k$ is thrown out of operation, the energy supplied from the prime mover $p$ to the generator $g$ is transformed into electric energy, and the said electric energy is supplied in an exclusively electrical way to the motor $m$ or motors $m^1$ and $m^2$ which drive the vehicle and can be regulated or reversed in the manner common in vehicles of the class described.

If the clutch $k$ is constructed as a friction or sliding clutch, the said clutch may be used if desired for transmitting part of the energy, so that the power is transmitted from the prime mover partly in an electrical and partly in a mechanical way, in which case the speed may be altered as required.

If it is desired to transmit the energy directly, that is without using the electrical apparatus, as may be necessary in case of a defect of the electrical apparatus, the power is transmitted in an exclusively mechanical way by means of the clutch $k$. If the latter is constructed as a friction or sliding clutch, it can be gradually thrown into operation, so that the vehicle is gradually started, as is necessary because the prime mover can not be overcharged in a large degree. If, however, the clutch $k$ is constructed as an interlocking clutch, a friction or sliding clutch $h$ is preferably provided.

Obviously, the differential gearing $d$ is effective in both cases, whether for starting the vehicle or in the normal course of the vehicle.

Claims:

1. In driving mechanism for motor vehicles, the combination with a prime mover and driven members, of a differential gearing connecting said prime mover mechanically with said driven members, a single dynamo connected to be directly driven by said prime mover, and a plurality of electric motors independently connected with and driving said driven members and receiving current from said dynamo.

2. In driving mechanism for motor vehicles, the combination with a prime mover and driven members, of a differential gearing connecting said prime mover mechanically with said driven members, a single dynamo connected to be directly driven by said prime mover, a plurality of electric motors independently connected with and driving said driven members and receiving current from said dynamo, and a friction clutch forming a yielding connection between said prime mover and differential gearing, for the purpose set forth.

3. In a driving mechanism for motor vehicles, the combination with a prime mover and driven members, of a single dynamo connected to be directly driven by the prime mover, a plurality of electric motors independently connected with and driving said driven members and receiving current from said dynamo, and means including differential gearing adapted to mechanically connect the prime mover and motors and the driven members directly connected to the latter.

In testimony whereof I have signed my name to this specification in the presence of two subscribing witnesses.

FRIEDEL COLLISCHONN.

Witnesses:
JEAN GRUND,
ERWIN DIBERLY.